US012349257B2

(12) United States Patent

Aliakseyeu et al.

(10) Patent No.: US 12,349,257 B2

(45) Date of Patent: Jul. 1, 2025

(54) SELECTING A SET OF LIGHTING DEVICES BASED ON AN IDENTIFIER OF AN AUDIO AND/OR VIDEO SIGNAL SOURCE

(71) Applicant: SIGNIFY HOLDING B.V., Eindhoven (NL)

(72) Inventors: Dzmitry Viktorovich Aliakseyeu, Eindhoven (NL); Niek Marcellus Cornelis Martinus Janssen, Eindhoven (NL); Leendert Teunis Rozendaal, Valkenswaard (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/274,008

(22) PCT Filed: Jan. 21, 2022

(86) PCT No.: PCT/EP2022/051328

§ 371 (c)(1), (2) Date: Jul. 25, 2023

(87) PCT Pub. No.: WO2022/157299

PCT Pub. Date: Jul. 28, 2022

(65) Prior Publication Data

US 2024/0431005 A1 Dec. 26, 2024

(30) Foreign Application Priority Data

Jan. 25, 2021 (EP) .................................... 21153261

(51) Int. Cl.

*H05B 47/155* (2020.01)
*H05B 47/12* (2020.01)

(52) U.S. Cl.

CPC ........... *H05B 47/155* (2020.01); *H05B 47/12* (2020.01)

(58) Field of Classification Search

CPC .............................. H05B 47/155; H05B 47/12

See application file for complete search history.

(56) References Cited

U.S. PATENT DOCUMENTS 9,642,225 B1 * 5/2017 Ng .......................... G10L 17/20
10,568,189 B2 * 2/2020 Julian .................. H05B 47/165
(Continued)

FOREIGN PATENT DOCUMENTS

CN 114868460 A * 8/2022 ............ G08C 17/00
EP 3550939 A1 * 10/2019 ............ G06F 3/167
(Continued)

*Primary Examiner* — Adam D Houston

(57) ABSTRACT

A system (11) for controlling a set of one or more lighting devices (31-32) based on an analysis of audio and/or video content and/or based on a light script associated with the audio and/or video content is configured to receive an audio and/or video signal from a source (43-45), determine an identifier of the source, and select the set of one or more lighting devices from a plurality of lighting devices (31-34) by selecting a set of one or more lighting devices associated with the identifier of the source. The audio and/or video signal comprises the audio and/or video content. The system is further configured to determine light effects based on the analysis of the audio and/or video content and/or based on the light script associated with the audio and/or video content and control the selected set of one or more lighting devices to render the light effects.

14 Claims, 5 Drawing Sheets

(56) References Cited

U.S. PATENT DOCUMENTS

| | | | | |
|---|---|---|---|---|
| 11,924,944 | B1 * | 3/2024 | Wu | H05B 47/12 |
| 12,188,652 | B1 * | 1/2025 | Lambesis | H05B 47/155 |
| 12,242,702 | B2 * | 3/2025 | Chang | H04L 51/046 |
| 12,243,280 | B2 * | 3/2025 | Meerbeek | H04N 5/66 |
| 12,245,344 | B2 * | 3/2025 | Aliakseyeu | H05B 47/19 |
| 12,245,345 | B1 * | 3/2025 | Wu | H05B 47/12 |
| 2015/0061511 | A1 * | 3/2015 | Chemel | F21V 21/15 315/153 |
| 2016/0295662 | A1 | 10/2016 | Hyde et al. | |
| 2017/0156196 | A1 * | 6/2017 | Lawrenson | H05B 45/20 |
| 2017/0188437 | A1 * | 6/2017 | Banta | G10L 15/22 |
| 2018/0082685 | A1 * | 3/2018 | Carlin | H05B 47/105 |
| 2018/0092189 | A1 * | 3/2018 | Reier | G10L 15/26 |
| 2018/0135842 | A1 * | 5/2018 | Gammons | H05B 47/16 |
| 2018/0228006 | A1 * | 8/2018 | Baker | G06F 3/167 |
| 2018/0330589 | A1 * | 11/2018 | Horling | G08B 15/002 |
| 2019/0104593 | A1 | 4/2019 | Aliakseyeu et al. | |
| 2019/0166674 | A1 | 5/2019 | Mason et al. | |
| 2019/0199545 | A1 * | 6/2019 | Ard | H05B 47/195 |
| 2020/0374996 | A1 * | 11/2020 | Barnes | H05B 47/196 |
| 2021/0029807 | A1 * | 1/2021 | Bard | H05B 47/196 |
| 2023/0217572 | A1 * | 7/2023 | Yang | H05B 47/125 315/291 |
| 2023/0225035 | A1 * | 7/2023 | Krajnc | H05B 47/155 315/149 |
| 2024/0001228 | A1 * | 1/2024 | Gilg | A63F 13/285 |
| 2024/0397596 | A1 * | 11/2024 | Borra | H05B 47/105 |
| 2024/0414826 | A1 * | 12/2024 | Borra | H05B 47/11 |
| 2024/0431005 | A1 * | 12/2024 | Aliakseyeu | H05B 45/20 |

FOREIGN PATENT DOCUMENTS

| | | | | | |
|---|---|---|---|---|---|
| EP | 4213447 | A1 | * | 7/2023 | H04L 12/2821 |
| GB | 2581500 | A | * | 8/2020 | F21K 9/232 |
| WO | WO-2015054611 | A1 | * | 4/2015 | H05B 45/20 |
| WO | WO-2018206359 | A1 | * | 11/2018 | F21V 23/0435 |
| WO | WO-2019028672 | A1 | * | 2/2019 | F21S 4/28 |
| WO | 2019042986 | A1 | | 3/2019 | |
| WO | 2019228969 | A1 | | 12/2019 | |
| WO | WO-2020165331 | A1 | * | 8/2020 | H04N 21/44008 |
| WO | WO-2021233733 | A1 | * | 11/2021 | H04L 12/2838 |
| WO | WO-2022043041 | A1 | * | 3/2022 | G11B 27/11 |
| WO | WO-2022144171 | A1 | * | 7/2022 | H04N 21/4131 |
| WO | WO-2022157299 | A1 | * | 7/2022 | H05B 45/20 |
| WO | WO-2023031085 | A1 | * | 3/2023 | H05B 45/20 |
| WO | WO-2023169993 | A1 | * | 9/2023 | H05B 47/155 |
| WO | WO-2024099856 | A1 | * | 5/2024 | H05B 45/20 |

* cited by examiner

SELECTING A SET OF LIGHTING DEVICES BASED ON AN IDENTIFIER OF AN AUDIO AND/OR VIDEO SIGNAL SOURCE

CROSS-REFERENCE TO PRIOR APPLICATIONS

This application is the U.S. National Phase application under 35 U.S.C. § 371 of International Application No. PCT/EP2022/051328, filed on Jan. 21, 2022, which claims the benefit of European Patent Application No. 21153261.9, filed on Jan. 25, 2021. These applications are hereby incorporated by reference herein.

FIELD OF THE INVENTION

The invention relates to a system for controlling a set of one or more lighting devices based on an analysis of audio and/or video content and/or based on a light script associated with said audio and/or video content.

The invention further relates to a method of controlling a set of one or more lighting devices based on an analysis of audio and/or video content and/or based on a light script associated with said audio and/or video content.

The invention also relates to a computer program product enabling a computer system to perform such a method.

BACKGROUND OF THE INVENTION

Philips' Hue Entertainment and Hue Sync have become very popular among owners of Philips Hue lights. Philips Hue Sync enables the rendering of light effects based on the content that is played on a computer, e.g. video games. Such a dynamic lighting system can dramatically influence the experience and impression of audio-visual material.

This new use of light can bring the atmosphere of a video game or movie right into the room with the user. For example, gainers can immerse themselves in the ambience of the gaming environment and enjoy the flashes of weapons fire or magic spells and sit in the glow of the force fields as if they were real. Hue Sync works by observing analysis areas of the video content and computing light output parameters that are rendered on Hue lights around the screen. When the entertainment mode is active, the selected lighting devices in a defined entertainment area will play light effects in accordance with the content depending on their positions relative to the screen.

Initially, Hue Sync was only available as an application for PCs. An HDMI module called the Hue Play HDMI Sync Box was later added to the Hue entertainment portfolio. This device addresses one of the main limitations of Hue Sync and aims at streaming and gaming devices connected to the TV. It makes use of the same principle of an entertainment area and the same mechanisms to transport information. This device is placed between any HDMI device and a TV and also acts as an HDMI switch.

With both the Hue Sync application and the Hue Play HDMI Sync Box, it is possible for a user to manually customize the entertainment lighting experience to his preferences, e.g. by increasing or decreasing the dynamicity of the light effects. However, since this needs to be performed manually, this preferably done as few times as possible.

US 2019/166674 A1 discloses a system which is able to automatically adjust a light output level based on the type of content, e.g. by selecting a dimmed setting for horror-themed games. Although it is an advantage of the latter system that different adjustments are made to the light effects at different moments without the user being required to manually change settings, the adjustments that are/can be made to the light effects are limited.

SUMMARY OF THE INVENTION

It is a first object of the invention to provide a system, which can be used to automatically and substantially adapt an entertainment lighting experience.

It is a second object of the invention to provide a method, which can be used to automatically and substantially adapt an entertainment lighting experience.

In a first aspect of the invention, a system for controlling a set of one or more lighting devices based on an analysis of audio and/or video content and/or based on a light script associated with said audio and/or video content, comprises at least one input interface, at least one output interface, and at least one processor configured to receive an audio and/or video signal from a source, i.e. an audio and/or video source, via said at least one input interface, said audio and/or video signal comprising said audio and/or video content, determine an identifier of said source, select said set of one or more lighting devices from a plurality of lighting devices by selecting a set of one or more lighting devices associated with said identifier of said source, determine light effects based on said analysis of said audio and/or video content and/or based on said light script associated with said audio and/or video content, and control, via said at least one output interface, said selected set of one or more lighting devices to render said light effects. Said at least one input interface is arranged for receiving an audio and/or video signal from a plurality of audio and/or video sources. Said identifier uniquely identifies said audio and/or video source from which the audio and/or video signal is received amongst the plurality of audio and/or video sources.

By selecting one or more lighting devices based on an identifier of the source of the audio and/or video signal and rendering entertainment light effects on only the selected lighting devices, the entertainment lighting experience can be customized to this source. Currently, the light effects may be adapted, e.g. based on user preferences, but all lighting devices in the defined entertainment area will play the adapted light effects. However, it is beneficial to use only a subset of the lighting devices when the content is received from a certain source, which has a relatively large impact on the entertainment lighting experience.

Each source (identifier) may have its own dedicated entertainment group where some lighting devices are shared, and some are unique. For example, a first audio and/or video signal source may be associated with a set which excludes a pixelated led strip, while a second audio and/or video signal source may be associated with a set which excludes a hanging lamp. What to exclude or include may, for example, depend on the user's position while consuming the audio and/or video content (e.g. watching a movie vs playing a game vs listening to music).

By selecting the one or more lighting devices based on an identifier of the source of the audio and/or video signal rather than a type of the audio and/or video content, the behavior of the system becomes more predictable. Furthermore, an identifier of a source of an audio and/or video signal is typically easier to determine than a type of the audio and/or video content. For example, said at least one processor may be configured to determine said identifier of said source by determining an identifier of an input port of said system, said audio and/or video signal being received on said input port of said system.

For instance, multiple sources may be connected to the Hue Play HDMI Sync Box, e.g. a game console, an Apple TV, or a Chromecast, and the Hue Play HDMI Sync Box is capable of distinguishing which input port is used. The current implementation of Hue Sync treats any on screen content in the same way, independent on whether it is e.g. the latest Call of Duty game or a National Geographic program, and if the user would want to change the set of lights used to render the content, he would need to do it manually via the Hue Sync settings. It is therefore beneficial to select a set of lighting devices based on the HDMI input port that is currently active, where the settings for each HDMI input port may be setup by the user or (semi)-automatically created by the system.

As a first example, when the source is an AppleTV, a large entertainment area may be used, as a large entertainment area is preferred when the whole family is watching TV, whereas when the source is a Nintendo Wii, a smaller entertainment zone may be used, as a smaller entertainment area is preferred when only the kids are playing a game and using the TV. As a second example, when a soccer match is viewed, an entertainment zone using lights proximate to the TV may be used (as people may be chatting during the match and looking in other directions than the TV), whereas if a movie is viewed, an entertainment zone including lights adjacent and behind the viewer may be used (to provide a more encompassing experience).

Said at least one processor may be configured to determine said identifier of said source by determining an identifier of an input port of a switch coupled to said system, said audio and/or video signal being received on said input port of said switch. If the system, e.g. an HDMI module, does not have enough input ports for all sources that the user owns, he may decide to use a (separate) HDMI switch to connect all sources to the system. Said audio and/or video signal may comprise said identifier of said input port of said switch (also referred to as "switch input port") when received by said system. The identifier of the source may be a concatenation of the identifier of the switch input port to which the source is coupled and the identifier of the system input port to which the switch is coupled. The latter is beneficial if the identifier of the switch input port to which the source is coupled is not unique.

Said at least one processor may be configured to determine said identifier of said source by determining an identifier of an input source selected on said system by a user. Input sources selectable on said system comprise input ports and other input sources, e.g. a tuner or other function (e.g. Internet radio). These input sources typically have an internal identifier and may also have a name that is visible to the user and which the user may even be able to change. An example of an internal identifier is "HDMI1". An example of a user-visible name is "game console". The use of input source identifiers is beneficial, because they are almost always available. The term "input source" is used from the perspective of the system. A source of an audio and/or video signal is not an input source of the system if it is coupled to an HDMI switch that is coupled to the system.

Said at least one processor may be configured to determine a type of said audio and/or video content and determine said identifier of said source based on said type of said audio and/or video content. For example, if the audio and/or video content belongs to a game, it may be assumed to originate from a game console. This may be beneficial, for example, if the source of the audio and/or video signal is not an input source of the system but is coupled to an HDMI switch that is coupled to the system.

Said at least one processor may be configured to extract audio and/or image features from said audio and/or video content, compare said extracted audio and/or image features with a plurality of sets of audio and/or image features, each of said plurality of sets of audio and/or image features being associated with a source identifier and/or a content type, and determine said identifier of said source and/or said type of said audio and/or video content based on said comparison. Said audio and/or image features may be fingerprints or characteristic features of a user interface, for example.

Said at least one processor may be configured to determine said identifier of said source and/or said type of said audio and/or video content based on metadata included in said audio and/or video signal. Said metadata may be included in an HDMI-CEC signal or in AVI InfoFrames comprised in the audio and/or video signal. The audio and/or video signal may be an HDMI signal, for example.

Said at least one processor may be configured to determine a video format of said audio and/or video signal and determine said identifier of said source based on said video format. For instance some video formats are exclusively used by PC games cards and may be associated with an identifier of a (gaming) PC. The video format may be determined from metadata included in the audio/or video signal, for example.

Said at least one processor may be configured to receive user input via said at least one input interface, said user input being indicative of said identifier of said source and indicative of said set of one or more lighting devices, and associate said set of said one or more lighting devices with said identifier. This allows the user to setup the associations for his sources, e.g. when starting to use the system.

Said at least one processor may be configured to detect a new lighting device, ask a user to indicate one or more source identifiers with which said new lighting device should be associated, and associate said new lighting device with said one or more source identifiers upon receiving said indication of said one or more source identifiers, said one or more source identifiers comprising said identifier of said source. This is beneficial when the user later adds a lighting device to the lighting system after the user has already started to use the system.

Said at least one processor may be configured to determine a user identifier of a user using said system and select said set of one or more lighting devices by selecting a set of one or more lighting devices associated with said user identifier and associated with said identifier of said source. This makes it possible to personalize the selection of the set of lighting devices.

Said at least one processor may be configured to transmit said identifier of said source to a further system, receive information associated with said identifier from said further system in response to said transmission, and select said set of one or more lighting devices based on said information. For example, an Internet server may store general information about generally preferred positions of lighting devices for certain sources and/or may store user-specific information in the form of associations between source identifiers and specific lighting devices. This further system helps determine which set of lighting devices to select.

In a second aspect of the invention, a method of controlling a set of one or more lighting devices based on an analysis of audio and/or video content and/or based on a light script associated with said audio and/or video content comprises receiving an audio and/or video signal from a source, said audio and/or video signal comprising said audio and/or video content, determining an identifier of said source, selecting said set of one or more lighting devices from a plurality of lighting devices by selecting a set of one or more lighting devices associated with said identifier of said source, determining light effects based on said analysis of said audio and/or video content and/or based on said light script associated with said audio and/or video content, and controlling said selected set of one or more lighting devices to render said light effects. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a set of one or more lighting devices based on an analysis of audio and/or video content and/or based on a light script associated with said audio and/or video content.

The executable operations comprise receiving an audio and/or video signal from a source, said audio and/or video signal comprising said audio and/or video content, determining an identifier of said source, selecting said set of one or more lighting devices from a plurality of lighting devices by selecting a set of one or more lighting devices associated with said identifier of said source, determining light effects based on said analysis of said audio and/or video content and/or based on said light script associated with said audio and/or video content, and controlling said selected set of one or more lighting devices to render said light effects.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a local computer, partly on the local computer, as a stand-alone software package, partly on the local computer and partly on a remote computer, or entirely on the remote computer or server. In the latter scenario, the remote computer may be connected to the local computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
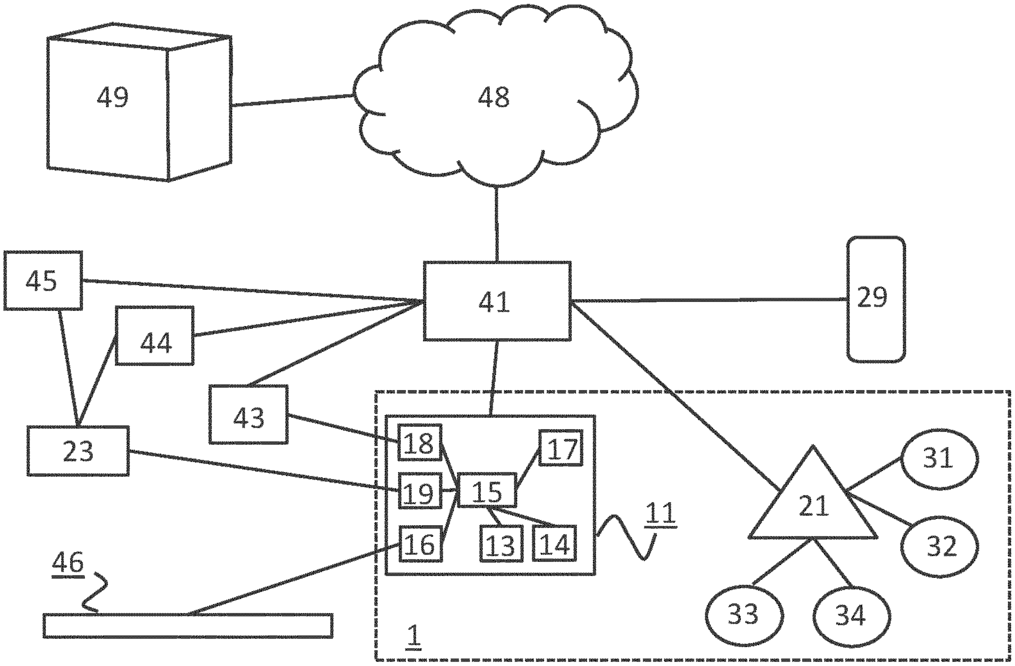
FIG. 1 is a block diagram of an embodiment of the system.

FIG. 1 shows an embodiment of the system for controlling a set of one or more lighting devices based on an analysis of audio and/or video content. In this embodiment, the system is an HDMI module 11. The HDMI module 11 may be a Hue Play HDMI Sync Box, for example.

In the example of FIG. 1, the HDMI module 11 is part of a lighting system 1. The lighting system 1 further comprises a bridge 21 and four wireless lighting devices 31-34. The bridge 21 may be a Hue bridge and the lighting devices 31-34 may be Hue lamps, for example. In the embodiment of FIG. 1, the HDMI module 11 can control the lighting devices 31-34 via the bridge 21. A mobile device 29 may also be able to control the lighting devices 31-34 via the bridge 21.

The bridge 21 communicates with the lighting devices 31-34 using a wireless communication protocol like e.g. Zigbee. In an alternative embodiment, the HDMI 11 can alternatively or additionally control the lighting devices 31-34 without a bridge, e.g. directly via Bluetooth or via the wireless LAN access point 41. Optionally, the lighting devices 31-34 are controlled via the cloud. The lighting devices 31-34 may be capable of receiving and transmitting Wi-Fi signals, for example.

The HDMI module 11 is connected to a wireless LAN access point 41, e.g. using Wi-Fi. The bridge 21 is also connected to the wireless LAN access point 41, e.g. using Wi-Fi or Ethernet. In the example of FIG. 1, the HDMI module 11 communicates to the bridge 21 via the wireless LAN access point 41, e.g. using Wi-Fi. Alternatively or additionally, the HDMI module 11 may be able to communicate directly with the bridge 21 e.g. using Zigbee, Bluetooth or Wi-Fi technology, or may be able to communicate with the bridge 21 via the Internet/cloud.

The HDMI module 11 is connected to a display device 46, e.g. a TV, a local media receiver 43 and an HDMI switch 23 via HDMI. Local media receivers 44 and 45 are connected to HDMI switch 23 via HDMI. The local media receivers 43-45 may comprise one or more streaming or content generation devices, e.g. an Apple TV, Microsoft Xbox One or Series X and/or Sony PlayStation 4 or 5, and/or one or more cable or satellite TV receivers. Each of the local media receivers 43-45 may be able to receive audio and/or video content from a remote media server and/or from a media server in the home network. The remote media server may be a server of a video-on-demand service such as Netflix, Amazon Prime Video, Hulu, Disney+ or Apple TV+, for example. The wireless LAN access point 41 and an Internet server 49 are connected to the Internet 48.

The HDMI module 11 comprises a receiver 13, a transmitter 14, a processor 15, memory 17, an output port 16 and input ports 18 and 19. The processor 15 is configured to receive an audio and/or video signal from one of the local media receivers 43-35 via the input ports 18 or 19. The audio and/or video signal comprises audio and/or video content. The processor 15 is further configured to determine an identifier of the source of the audio and/or video signal, select a set of one or more of lighting devices 31-34, e.g. lighting devices 31 and 32, by selecting a set of one or more lighting devices associated with the identifier of the source, determine light effects based on the analysis of the audio and/or video content, and control, via the transmitter 14, the selected set of one or more lighting devices to render the light effects.

In the embodiment of FIG. 1, the processor 15 is configured to determine the identifier of the source by determining an identifier of input port 18 or 19 of HDMI module 11 and/or of an(other) input source selected on the HDMI module 11 by a user. In the example of FIG. 1, if input port 18 has been selected on the HDMI module 11, the set of lighting devices is selected based on an identifier of the selected input port 18, and if input port 19 has been selected, an identifier of an input port of the HDMI switch 23 is determined from metadata included in the audio and/or video signal, which is received on input port 19, and the set of lighting devices is selected based on this identifier, optionally on a combination of this identifier and the identifier of input port 19. In this example, the identifier of input port 19 indicates that HDMI switch 23 is coupled to the HDMI module 11.

In an alternative embodiment, the source identifier is determined based on metadata included in the audio and/or video signal. For example, addresses of the sources may be determined from an HDMI-CEC (sub)signal in the HDMI signal.

In addition to being configured to select a set of lighting devices based on the source identifier, the processor 15 may be configured to determine video processing settings based on the source identifier and analyze the audio and/or video content according to these video processing settings to determine the light effects and/or may be configured to determine entertainment light settings based on the source identifier and determine light effects for the selected set of lighting devices and/or for other lighting devices based on the entertainment light settings.

Video processing settings may define what areas of the screen should be used to map content to the lighting devices, e.g. from which area(s) an average color should be determined, what type of algorithm should be used for the mapping, or what the brightness of the light effects should be, for example. Entertainment light settings may include a default dynamicity setting that gets activated as soon as a certain source, e.g. of a certain type, is selected, a setting that defines the behavior of lighting devices that are not part of the entertainment group but are in the nearby area (e.g. when a certain source is selected, these lighting devices might be automatically dimmed), or a setting that determines whether to automatically activate the entertainment mode (i.e. start to control the set of lighting devices based on the analysis of the audio and/or video content) when a certain source is selected, for example.

The entertainment light settings may further specify whether to use an audio and/or video signal source signature or an input source signature, e.g. a color effect that is displayed when a user switches between HDMI input ports or when an HDMI input port is selected automatically (e.g. the HDMI module 11 may detect that audio and/or video content is being received or may detect an active audio and/or video signal source based on HDMI-CEC signals). This helps provide early feedback, e.g. when switching input ports, as it may take some time before the HDMI processing in source, HDMI module and display device are all up and running. During this period, feedback may be shown on the lighting devices as to which input port (or source) has been selected, e.g. red for an input port connected to an Xbox and blue for an input port connected to a Netflix box. The audio and/or video signal received on the selected input port will be passed to the display device and also analyzed in order to determine the light effects.

The set of lighting devices, video processing settings, and entertainment light settings associated with a source identifier may be treated as a preset. This allows the user to select another preset in certain situations. For example, even if the audio and/or video signal is being received from an Apple TV, the user may be able to select the Xbox preset via an app or another user input means.

The processor 15 may be configured to receive, via the receiver 13, user input indicative of an identifier of a source, e.g. an identifier of an input port of HDMI module 11 or a concatenation of identifiers of input ports of HDMI module 11 and HDMI switch 23, and indicative of a set of one or more of the lighting devices 31-34, and associate the set with the identifier, e.g. in memory 17. This user input may be received from mobile device 29, for example.

For instance, the system may prompt the user to manually customize the set of lighting devices to be controlled, and optionally the entertainment light settings and/or video processing settings, for each of a plurality of sources. This plurality of sources may comprise the sources for which the system has already been able to determine an identifier. Alternatively, the user may be able to indicate that he wants to associate the currently active/selected source with one or more lighting devices.

Alternatively, the system might ask the user a few questions about each source, which would allow it to propose a set of lighting devices, and optionally the entertainment light and/or video processing settings, for each source based on the user's answers. Alternatively, the system might propose a set of lighting devices, and optionally entertainment light settings and/or video processing settings, based on the detected source identifier, and then give the user the option to indicate approval and/or disapproval.

When a new source is selected on or detected by the HDMI module 11, the user may be given the option of duplicating a set of lighting devices or a whole preset associated with another source (identifier). Next, the user may be given the opportunity to customize the duplicated set of lighting devices or the duplicated preset to the new source if necessary.

After sets of lighting devices have been associated with selectable sources, one of them is automatically selected as soon as the HDMI module 11 detects that another input source has been selected on the system by the user or has been selected automatically by the system, e.g. because it receives an audio and/or video signal comprising a "One Touch Play" HDMI-CEC command, or detects that the audio and/or video signal received on the selected input port originates from a different source, e.g. because the user has selected another input port on the HDMI switch 23. When the set of lighting devices is selected, the user may also be given the option to switch to a default set of lighting devices, e.g. all lighting devices in the entertainment area.

Alternatively or additionally, the processor 15 may be configured to detect a new lighting device, ask a user to indicate one or more source identifiers with which the new lighting device should be associated, and associate the new lighting device with the one or more source identifiers, e.g. in memory 17, upon receiving the indication of the one or more source identifiers. The bridge 21 may detect the new lighting device automatically or the user may use mobile device 29 to add the new lighting device manually, after which the mobile device 29 is used to ask the user to indicate the one or more source identifiers.

In this way, the above-mentioned presets may be modified after a new lighting device has been added. When a new set of one or more lighting devices is added, the presets may be modified to include or exclude the new set of lighting devices. The modification could be based on the user input, e.g. system could prompt the user and ask to which sources these lighting devices should be added, or based on the current presets, automatically estimate how well the new lighting devices fit and then decide to include or exclude them. When a lighting device is removed from the lighting system, the lighting device may automatically be removed from the presets that comprise the lighting device.

The processor 15 may be configured to determine a user identifier of a user who is using the HDMI module 11 and select the set of one or more lighting devices by selecting a set of one or more lighting devices associated with the user identifier and associated with the identifier of the source. The user identifier may be determined by using face recognition or by receiving the user identifier from a nearby mobile device, e.g. mobile device 29. When the user provides user input indicating one or more source identifiers, as described above, the user identifier may also be determined automatically at that moment and associated with the one or more source identifiers and the one or more lighting devices.

In this way, the above-mentioned presets may be personalized. Different users of the system could have different presets. A different preset of the active user may be selected when a different source is selected or detected. The active user may be identified based on who starts the system (if it requires login) or manually, i.e. the user is asked to indicate who the active user is. Moreover, other implicit means may be used to detect the active user, such as sensing the closest personal smart device, or using other sensing means available to the system (e.g. a connected camera).

The processor 15 may be configured to transmit the identifier of the source to an Internet server 49, receive information associated with the identifier from the Internet server 49 in response to the transmission, and select the set of one or more lighting devices based on the information. As a first example, both the source identifier and a user identifier may be transmitted to the Internet server 49 and the information received in response may indicate one or more of lighting devices 31-34. As a second example, if the source identifier is "Cable TV", the information received from the Internet server 49 may indicate that most users use only lighting devices close to the display device with this source and the lighting devices closes to display device 46, e.g. lighting devices 31 and 32, may be selected based on this information. The latter may be used as default settings when the user has not (yet) selected one or more lighting devices for a source himself.

In the embodiment of the HDMI module 11 shown in FIG. 1, the HDMI module 11 comprises one processor 15. In an alternative embodiment, the HDMI module 11 comprises multiple processors. The processor 15 of the HDMI module 11 may be a general-purpose processor, e.g. ARM-based, or an application-specific processor. The processor 15 of the HDMI module 11 may run a Unix-based operating system for example. The memory 17 may comprise one or more memory units. The memory 17 may comprise solid-state memory, for example.

The receiver 13 and the transmitter 14 may use one or more wired or wireless communication technologies such as Wi-Fi to communicate with the wireless LAN access point 41 and HDMI to communicate with the display device 46 and with local media receivers 43 and 44, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 13 and the transmitter 14 are combined into a transceiver.

The HDMI module 11 may comprise other components typical for a consumer electronic device such as a power connector. The invention may be implemented using a computer program running on one or more processors. In the embodiment of FIG. 1, the system is an HDMI module. In an alternative embodiment, the system is a different type of device, e.g. a display device like a TV. If the system is a (smart) display device, an app may be running on the display device and the display device may inform the app what HDMI source is currently being used. The app might still be able to perform an own analysis of the audio and/or video content, but typically, the display device will recognize the source (e.g. Xbox vs Apple TV). The app may also be able to recognize video being played from external non-HDMI sources (e.g. USB drive) and determine a source identifier for each of these external non-HDMI sources. The app controls the set of lighting devices.

In the embodiment of FIG. 1, the light effects are determined based on analysis of the audio and/or video content. In an alternative embodiment, the light effects are alternatively or additionally determined based on a light script associated with the audio and/or video content. In the embodiment of FIG. 1, the system comprises a single device. In an alternative embodiment, the system comprises multiple devices.

Figure 2:
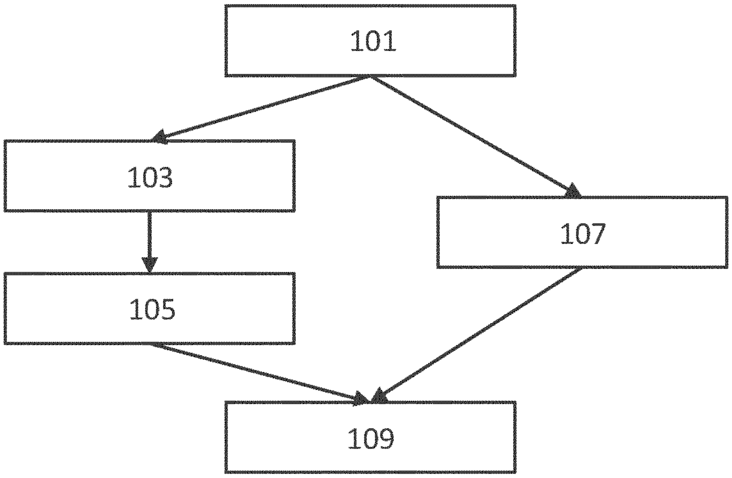
FIG. 2 is a flow diagram of a first embodiment of the method.

A first embodiment of the method of controlling a set of one or more lighting devices based on an analysis of audio and/or video content and/or based on a light script associated with the audio and/or video content is shown in FIG. 2. A step 101 comprises receiving an audio and/or video signal from a source, either directly or via one or more other devices. The audio and/or video signal comprises the audio and/or video content. Steps 103 and 107 are performed after step 101.

Step 103 comprises determining an identifier of the source. Next, a step 105 comprises selecting the set of one or more lighting devices from a plurality of lighting devices by selecting a set of one or more lighting devices associated with the identifier of the source. Step 107 comprises determining light effects based on the analysis of the audio and/or video content and/or based on the light script associated with the audio and/or video content. A step 109 comprises controlling the set of one or more lighting devices selected in step 105 to render the light effects determined in step 107.

Step 107 may comprise analyzing the audio and/or video content to determine the light effects, but this may not (always) be necessary. For example, an Apple TV might be detected as source (this detection may involve analyzing the audio and/or video content) and then an analysis of what TV program is being streamed by the Apple TV (e.g. from metadata supplied by Apple) may be performed, the light script associated with this TV program may be retrieved and the light effects specified in the light script may be rendered on the set of lighting devices associated with the Apple TV.

Figure 3:
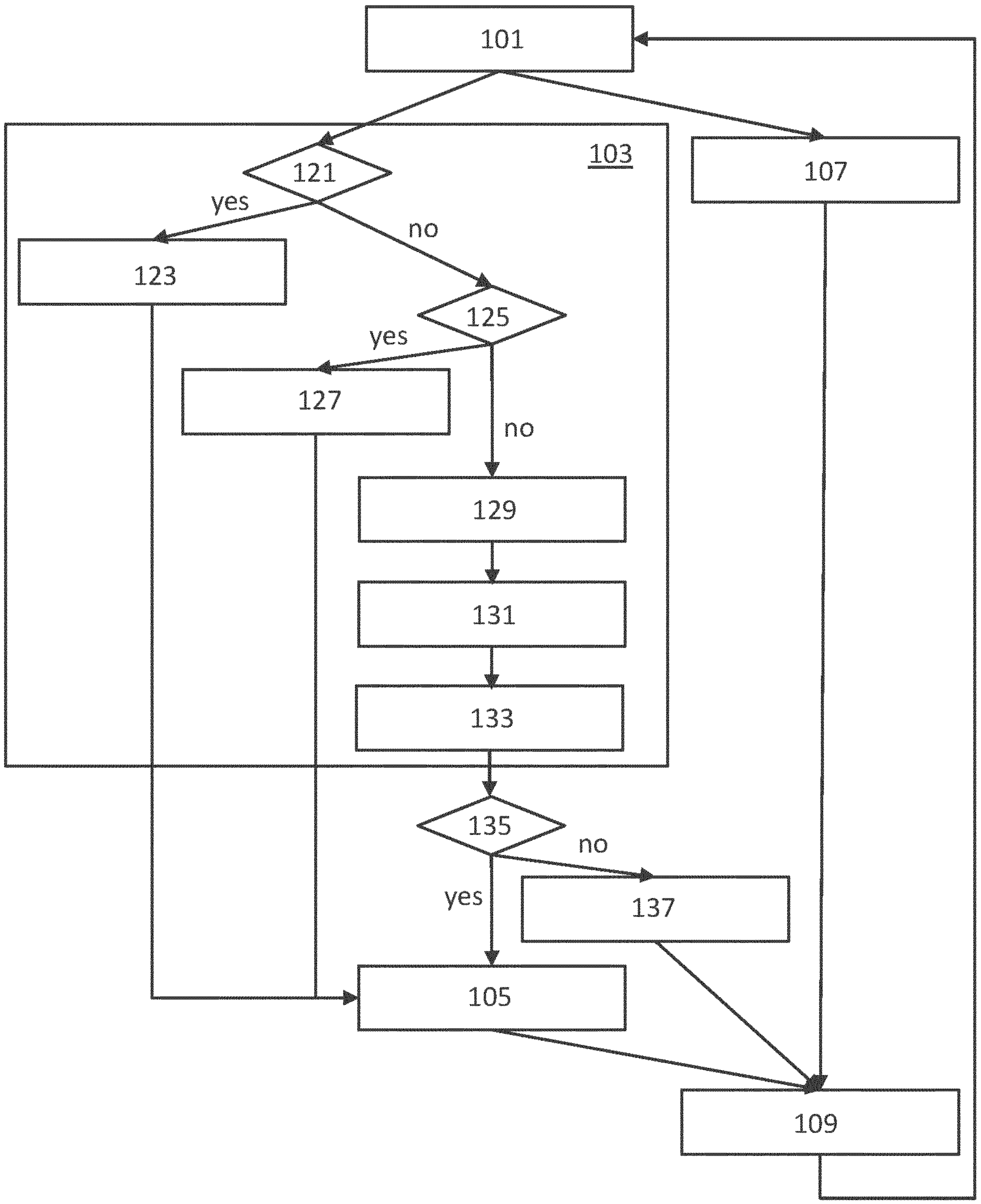
FIG. 3 is a flow diagram of a second embodiment of the method.

A second embodiment of the method of controlling a set of one or more lighting devices based on an analysis of audio and/or video content and/or based on a light script associated with the audio and/or video content is shown in FIG. 3. Step 101 comprises receiving an audio and/or video signal from a source, either directly or via one or more other devices. The audio and/or video signal comprises audio and/or video content. Steps 103 and 107 are performed after step 101.

Step 103 comprises determining an identifier of the source of the audio and/or video signal. Step 103 is implemented by steps 121-133. Step 121 comprises determining whether an association has been stored between an identifier of an input source selected by a user on the system that controls the one or more lighting devices, i.e. the currently selected input source, and an identifier of a source. If so, a step 123 is performed. Step 123 comprises determining the identifier of the source by determining the identifier of the input source selected by the user. The input source may correspond to an input port or to a function, e.g. (Internet) tuner. If the input source corresponds to an input port, e.g. HDMI port 1, this means that the audio and/or video signal is received on this input port and step 123 comprises determining an identifier of this input port, e.g. "HDMI1".

If it is determined in step 121 that such an association has not been stored, e.g. because the currently selected input source corresponds to a switch to which multiple sources are connected, a step 125 is performed. Step 125 comprises determining whether it is possible to determine the identifier of the source based on metadata included in the audio and/or video signal. If so, a step 127 is performed.

Step 127 comprises determining the identifier of the source based on the metadata included in the audio and/or video signal. As a first example, the audio and/or video signal, when received by the system, may comprise an identifier of an input port of a switch coupled to the system.

The switch receives the audio and/or video signal on the identified input port and then adds the identifier before routing the audio and/or video signal to the system. In this example, step 127 comprises determining an identifier of the input port of the switch, e.g. "HDMI1", which may be concatenated with an identifier of the switch, e.g. "MC621".

As a second example, step 127 may comprise determining a video format of the audio and/or video signal and determining the identifier of the source based on the video format. Some formats are used exclusively by PC game cards hence detection of such video format may result in the determination of an identifier of a (gaming) PC. Also, the use of 3D, or a particular 3D format can hint at a particular source being used.

As a third example, step 127 may comprise determining the identifier of the source based on metadata included in an HDMI-CEC signal which is comprised in the audio and/or video signal. For example, each HDMI source has a different address and the active source and its address may be determined from <Active Source> and <Set Stream Path> messages in the HDMI-CEC signal. Furthermore, the metadata included in an HDMI-CEC signal may provide information about the type of a device and its name (e.g. "XBOX" or "Chromecast").

As a fourth example, step 127 may comprise determining the identifier of the source based on metadata included in AVI InfoFrames. AVI InfoFrames are pieces of metadata interspersed in the audio and/or video signal, e.g. HDMI signal, and can provide information on the content being played.

If it is determined in step 125 that such metadata is not included in the audio and/or video signal, a step 129 is performed. Step 129 comprises extracting audio and/or image features from the audio and/or video content. Step 131 comprises comparing the extracted audio and/or image features with a plurality of sets of audio and/or image features. Each of the plurality of sets of audio and/or image features is associated with a source identifier. Step 133 comprises determining the identifier of the source based on the comparison.

As a first example, the extracted audio and/or image features may be compared with audio and/or image features that are characteristic for the source. For instance, some game consoles and TV media boxes have a particular and fixed screen layout in their menu/pause screens (e.g. PIP window in a particular position).

As a second example, the extracted audio and/or image features may be fingerprints. For instance, if a fingerprint extracted from the audio and/or video content in step 129 matches a reference fingerprint associated with a source identifier in step 131, this source identifier will be determined in step 133. Reference fingerprints of a boot-up screen of a game console or a cable receiver may be associated with identifiers of these devices, for example.

A step 135 is performed after step 133. Step 135 comprises determining whether it was possible to determine the identifier of the source in step 133. If so, step 105 is performed. If not, a step 137 is performed. Step 137 comprises selecting a default set of one or more lighting devices, e.g. all of the lighting devices, from a plurality of lighting devices.

Step 105 comprises selecting a set of one or more lighting devices associated with the identifier of the source, as determined in step 123, 127, or 133, from the plurality of lighting devices. Step 107 comprises determining light effects based on the analysis of the audio and/or video content and/or based on the light script associated with the audio and/or video content. When the audio and/or video content comprises music, it may be beneficial to determine the light effects only on the audio portion of the audio and/or video content. Step 109 is performed after step 107 has been performed and either step 105 or step 137 has been performed. Step 109 comprises controlling the set of one or more lighting devices selected in step 105 or 137 to render the light effects determined in step 107.

Figure 4:
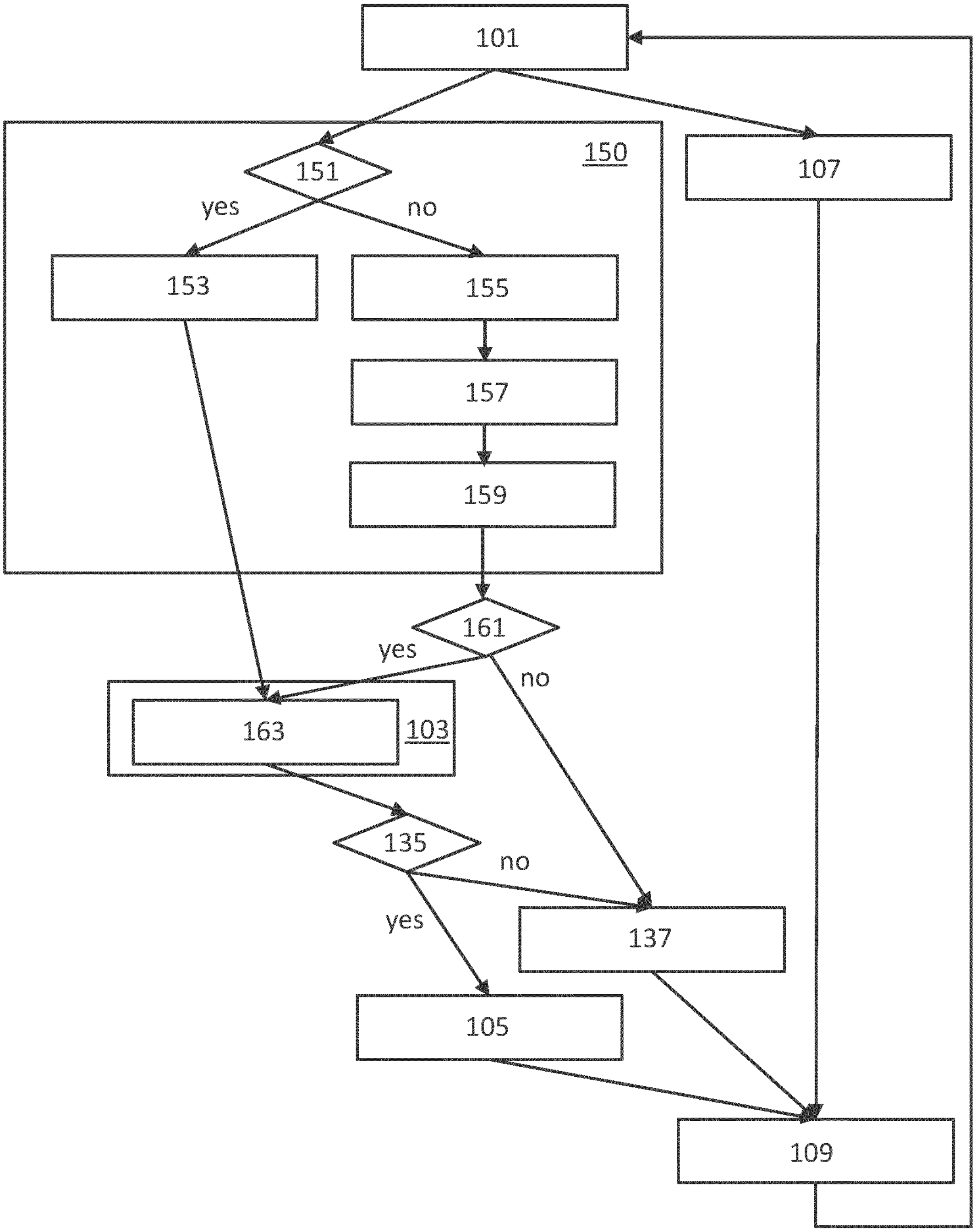
FIG. 4 is a flow diagram of a third embodiment of the method.

In the embodiment of FIG. 3, it is attempted to determine an identifier of the source in three ways in a certain order. In an alternative embodiment, it is attempted to determine the identifier of the source in fewer or more than three ways and/or in a different order than shown in FIG. 3. In this alternative embodiment or in another embodiment, one or more of the three ways shown in FIG. 3 are omitted. A third embodiment of the method of controlling a set of one or more lighting devices based on an analysis of audio and/or video content and/or based on a light script associated with the audio and/or video content is shown in FIG. 4. Step 101 comprises receiving an audio and/or video signal from a source, either directly or via one or more other devices. The audio and/or video signal comprises audio and/or video content. Steps 150 and 107 are performed after step 101.

Step 150 is implemented by steps 151-159. Step 151 comprises determining whether it is possible to determine a type of the audio and/or video content based on metadata included in the audio and/or video signal. If so, a step 153 is performed. Step 153 comprises determining the type of the audio and/or video content based on metadata included in the audio and/or video signal, e.g. EPG data. For example, the metadata may specify "game" or "cable channel" or "streamed movie" or may specify the title of the program being watched or game being played, e.g. "Unchartered 2". Step 103 is performed after step 153.

If it is determined in step 151 that such metadata is not included in the audio and/or video signal, a step 155 is performed. Step 155 comprises extracting audio and/or image features from the audio and/or video content. Step 157 comprises comparing the extracted audio and/or image features with a plurality of sets of audio and/or image features. Each of the plurality of sets of audio and/or image features is associated with a content type. Step 159 comprises determining the type of the audio and/or video content based on the comparison of step 157.

As a first example, the extracted audio and/or image features may be compared with audio and/or image features that are characteristic for certain type of audio and/or video content. For instance, games typically have relatively large portion of the screen that is static, e.g. reflecting a selected weapon, a steering wheel of a car, or a status of the gamer's avatar.

As a second example, the extracted audio and/or image features may be fingerprints. For instance, if a fingerprint extracted from the audio and/or video content in step 155 matches a reference fingerprint associated with a certain type of audio and/or video content in step 157, this type will be determined in step 159. Reference fingerprints of game start screens may be associated with game content and reference fingerprints of movies or movie studio intros may be associated with movies, for example.

A step 161 is performed after step 159. Step 161 comprises determining whether it was possible to determine the type of the audio and/or video content in step 159. If so, step 103 is performed. If not, a step 137 is performed. Step 137 comprises selecting a default set of one or more lighting devices, e.g. all of the lighting devices, from a plurality of lighting devices.

Step 103 comprises determining an identifier of the source of the audio and/or video signal. Step 103 is implemented by a step 163. Step 163 comprises determining the identifier of the source based on the type of the audio and/or video content determined in step 153 or 159. For example, if the type determined in step 153 or 159 was "game", then a source identifier corresponding to a game console may be determined in step 163. It may not be necessary to identify the exact brand and type of game console if it is acceptable to use the same set of lighting devices for any game console or if the user only has one gaming device.

If the type determined in step 153 or 159 was "movie", then it may not be possible not determine whether the source is a game console or a cable or satellite receiver and step 150 may then be repeated at a later time. Step 135 is performed after step 163. Step 135 comprises determining whether it was possible to determine the identifier of the source in step 163. If so, step 105 is performed. If not, step 137 is performed.

Step 105 comprises selecting a set of one or more lighting devices associated with the identifier of the source, as determined in step 163, from the plurality of lighting devices. Step 107 comprises determining light effects based on the analysis of the audio and/or video content and/or based on the light script associated with the audio and/or video content. Step 109 is performed after step 107 has been performed and either step 105 or step 137 has been performed. Step 109 comprises controlling the set of one or more lighting devices selected in step 105 or 137 to render the light effects determined in step 107.

In the embodiment of FIG. 4, it is attempted to determine an identifier of the audio and/or video content in two ways in a certain order. In an alternative embodiment, it is attempted to determine the identifier of the audio and/or video content in fewer or more than two ways and/or in a different order than shown in FIG. 4. In this alternative embodiment or in another embodiment, one or more of the two ways shown in FIG. 4 are omitted.

Figure 5:
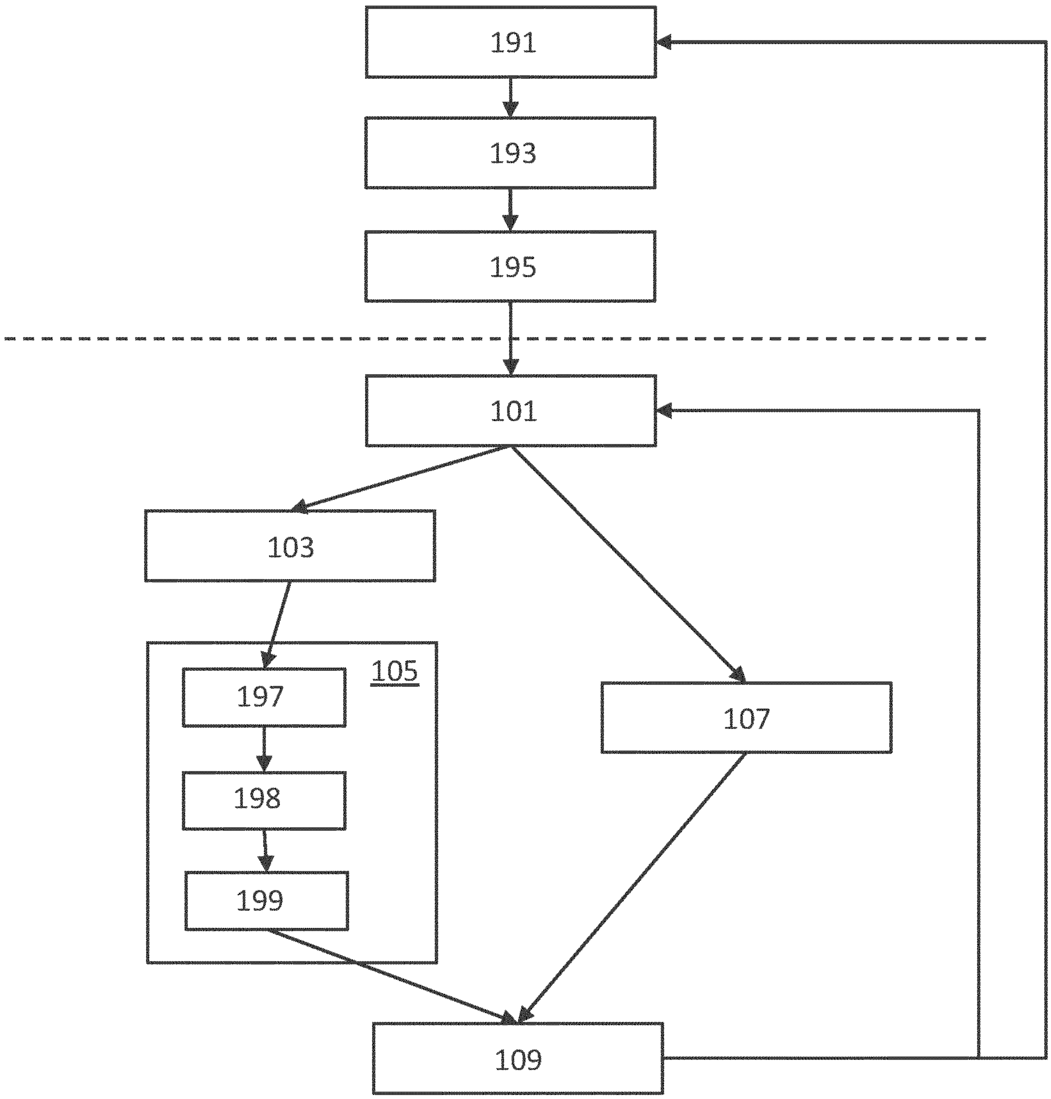
FIG. 5 is a flow diagram of a fourth embodiment of the method.

A fourth embodiment of the method of controlling a set of one or more lighting devices based on an analysis of audio and/or video content and/or based on a light script associated with the audio and/or video content is shown in FIG. 5. The embodiment of FIG. 5 is an extension of the embodiment of FIG. 2. In the embodiment of FIG. 5, steps 191-195 are performed before step 101 of FIG. 2 and step 105 of FIG. 2 is implemented by steps 197-199.

Step 191 comprises detecting a new lighting device. Step 193 comprises asking a user to indicate one or more source identifiers with which the new lighting device should be associated. Step 195 comprises associating the new lighting device with the one or more source identifiers upon receiving the indication of the one or more source identifiers. Somewhat later, step 101 is performed. Steps 103 and 107 are performed after step 101. The identifier of the source determined in step 103 is comprised in the one or more source identifiers indicated by the user in step 195.

As part of step 105, step 197 comprises transmitting the identifier of the source, as determined in step 103, to a further system. Step 107 comprises receiving information associated with the identifier from the further system in response to the transmission. Step 199 comprises selecting the set of one or more lighting devices based on the information received in step 107. Step 109 is performed after step 105 and 107 have been performed, as described in relation to FIG. 2. Step 191 or step 101 may be repeated after step 109, after which the method proceeds as shown in FIG. 5.

Figure 6:
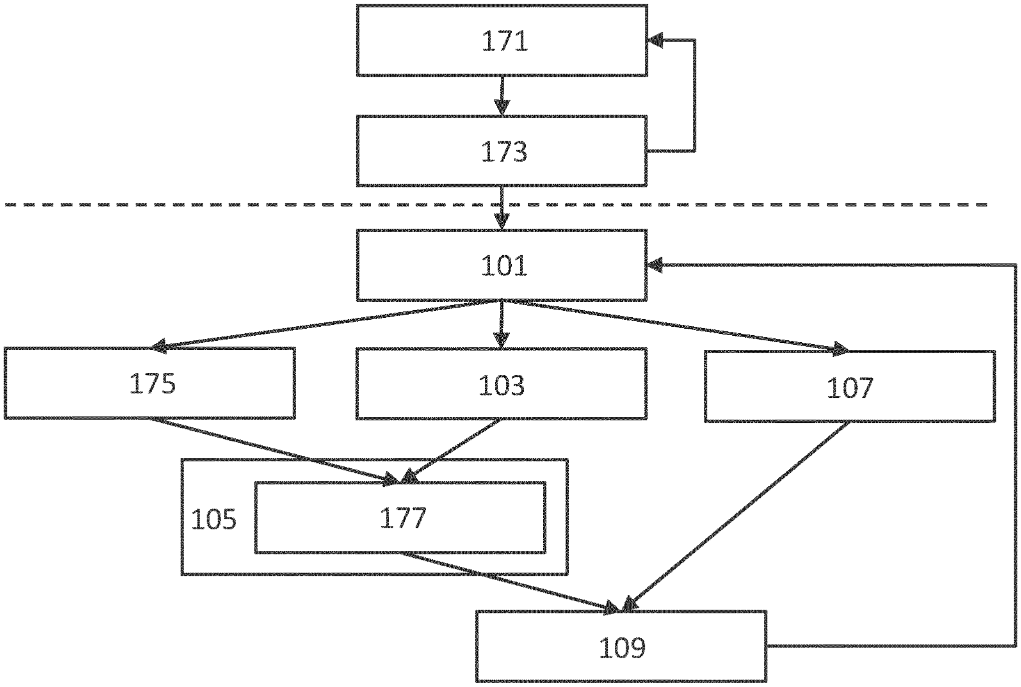
FIG. 6 is a flow diagram of a fifth embodiment of the method.

A fifth embodiment of the method of controlling a set of one or more lighting devices based on an analysis of audio and/or video content and/or based on a light script associated with the audio and/or video content is shown in FIG. 6. The embodiment of FIG. 6 is an extension of the embodiment of FIG. 2. In the embodiment of FIG. 6, steps 171 and 173 are performed before step 101 of FIG. 2, step 105 of FIG. 2 is implemented by a step 177, and a step 175 is performed before step 105.

Step 171 comprises receiving user input which is indicative of an identifier of a source and indicative of a set of one or more lighting devices. Step 173 comprises associating the set of the one or more lighting devices with the source identifier and with one or more user identifiers. Steps 171 and 173 may be repeated one or more times for other sources.

Somewhat later, step 101 is performed. Steps 175, 103 and 107 are performed after step 101. The identifier of the source determined in step 103 is comprised in the one or more source identifiers indicated by the user in step 171. Step 175 comprises determining a user identifier of a user currently using the system. As part of step 105, step 177 comprises selecting a set of one or more lighting devices associated with the user identifier (determined in step 175) and associated with the identifier of the source (determined in step 103). Step 109 is performed after step 105 and 107 have been performed, as described in relation to FIG. 2. Step 101 may be repeated after step 109, after which the method proceeds as shown in FIG. 6.

The embodiments of FIGS. 2 to 6 differ from each other in multiple aspects, i.e. multiple steps have been added or replaced. In variations on these embodiments, only a subset of these steps is added or replaced and/or one or more steps is omitted. For example, steps 191 to 193 or steps 197 to 199 may be omitted from the embodiment of FIG. 5, steps 171 and 173 or steps 175 and 177 may be omitted from the embodiment of FIG. 6, and/or one or more (and even all) of the embodiments of FIGS. 2 to 6 may be combined.

Figure 7:
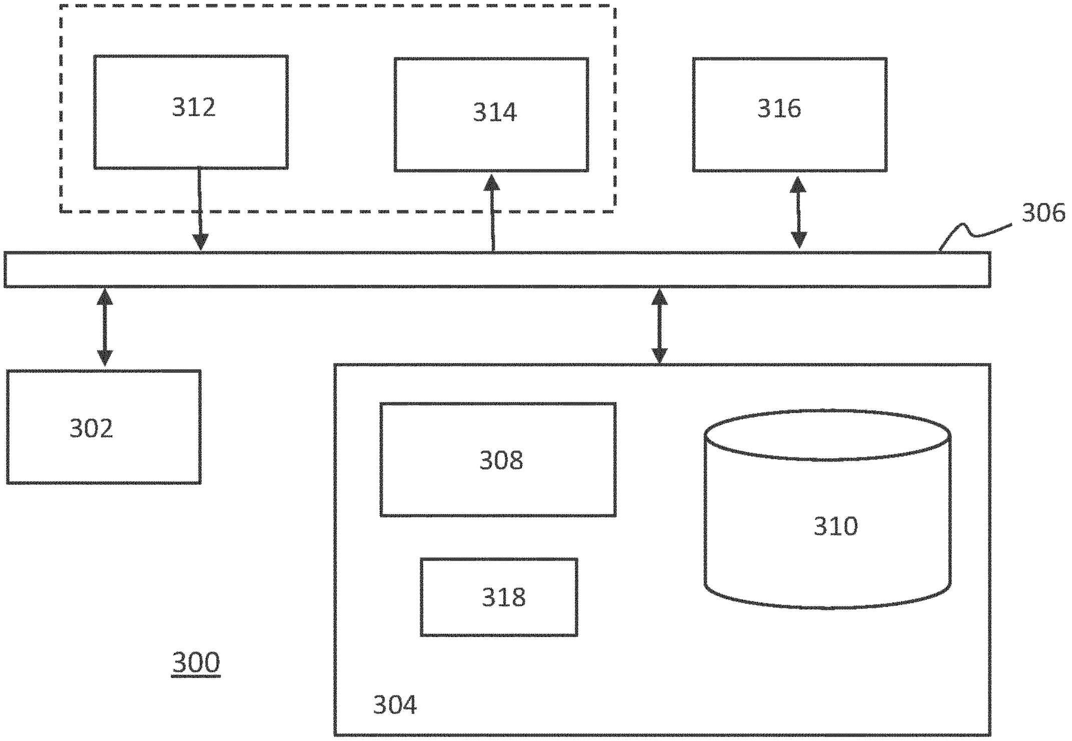
FIG. 7 is a block diagram of an exemplary data processing system for performing the method of the invention.

FIG. 7 depicts a block diagram illustrating an exemplary data processing system that may perform the method as described with reference to FIGS. 2 to 6.

As shown in FIG. 7, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 7, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 7) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for selecting a set of one or more lighting devices from a plurality of lighting devices and for controlling said selected set of lighting devices, based on analysis of audio and/or video content, said system comprising:

at least one input interface arranged for receiving an audio and/or video signal from a plurality of audio and/or video sources;

at least one output interface arranged for controlling said plurality of lighting devices; and at least one processor configured to:

receive an audio and/or video signal from an audio and/or video source of the plurality of audio and/or video sources via said at least one input interface, said audio and/or video signal comprising said audio and/or video content, determine an identifier of said audio and/or video source, said identifier uniquely identifying said audio and/or video source from which the audio and/or video signal is received amongst the plurality of audio and/or video sources, select said set of one or more lighting devices from the plurality of lighting devices by selecting one or more lighting devices associated with said determined identifier of said audio and/or video source, analyze said audio and/or video content, determine light effects based on said analysis of said audio and/or video content, and control, via said at least one output interface, said selected set of one or more lighting devices to render said determined light effects.

2. A system as claimed in claim 1, wherein said at least one processor is configured to determine said identifier of said audio and/or video source by determining an identifier of the at least one input interface of said system via which said audio and/or video signal is received from said audio and/or video source.

3. A system as claimed in claim 1, wherein said at least one processor is configured to determine said identifier of said audio and/or video source by determining an identifier of an input port of a switch coupled to said system via said at least one input interface, said audio and/or video signal being received by the system via said input port of said switch.

4. A system as claimed in claim 3, wherein said audio and/or video signal comprises said identifier of said input port of said switch when received by said system.

5. A system as claimed in claim 1, wherein said at least one processor is configured to determine a type of said audio and/or video content and determine said identifier of said audio and/or video sources based on said type of said audio and/or video content.

6. A system as claimed in claim 1, wherein said at least one processor is configured to:

extract audio and/or image features from said audio and/or video content, compare said extracted audio and/or image features with a plurality of sets of audio and/or image features, each of said plurality of sets of audio and/or image features being associated with a determined identifier of one of said plurality of audio and/or video sources, and determine said identifier of said audio and/or video source (43-45) based on said comparison.

7. A system as claimed in claim 1, wherein said at least one processor is configured to determine said identifier of said audio and/or video source based on metadata included in said audio and/or video signal.

8. A system as claimed in claim 1, wherein said audio and/or video signal comprises a video signal and wherein said at least one processor is configured to determine a video format of said video signal and determine said identifier of said audio and/or video source based on said determined video format.

9. A system as claimed in claim 1, wherein said at least one processor is configured to receive user input via said at least one input interface, said user input being indicative of said identifier of said audio and/or video source and indicative of said set of one or more lighting devices, and associate said set of said one or more lighting devices with said identifier.

10. A system as claimed in claim 1, wherein said at least one processor is configured to detect a new lighting device, ask a user to indicate one or more audio and/or video sources of the plurality of audio and/or video sources with which said new lighting device should be associated, determine an identifier of each of said indicated one or more audio and/or video sources, and associate said new lighting device with said identifier of said indicated one or more audio and/or video sources.

11. A system as claimed in claim 1, wherein said at least one processor is configured to determine a user identifier of a user using said system and select said set of one or more lighting devices by selecting a set of one or more lighting devices associated with said user identifier and associated with said identifier of said audio and/or video source.

12. A system as claimed in claim 1, wherein said at least one processor is configured to transmit said identifier of said audio and/or video source to a further system, receive information associated with said identifier from said further system in response to said transmission, and select said set of one or more lighting devices based on said information.

13. A method of selecting a set of one or more lighting devices from a plurality of lighting devices and for controlling said selected set of lighting devices, based on an analysis of audio and/or video content and/or based on a light script associated with said audio and/or video content, said method comprising:

receiving an audio and/or video signal from an audio and/or video source of a plurality of audio and/or video sources, said audio and/or video signal comprising said audio and/or video content;

determining an identifier of said audio and/or video source, said identifier uniquely identifying said audio and/or video source from which the audio and/or video signal is received amongst the plurality of audio and/or video sources;

selecting said set of one or more lighting devices from the plurality of lighting devices by selecting one or more lighting devices associated with said determined identifier of said audio and/or video source;

analyzing said audio and/or video content;

determining light effects based on said analysis of said audio and/or video content and/or based on said light script associated with said audio and/or video content; and controlling said selected set of one or more lighting devices to render said light effects.

14. A computer program product for a computing device, the computer program product comprising computer program code to perform the method of claim 13 when the computer program product is run on a processor of the computing device.

* * * * *